Figures 1, 2, 3:
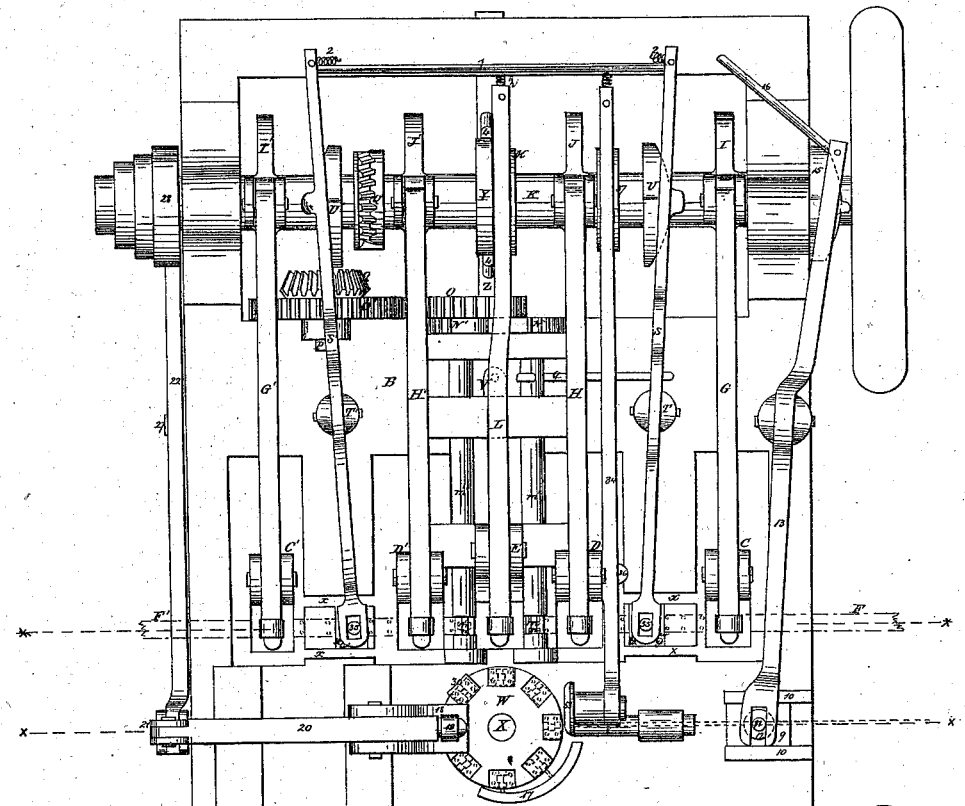

C. Miller,
Making Hinges,
Nº 12,443. Patented Feb. 27, 1855.

Sheet 1 - 2 Sheets.

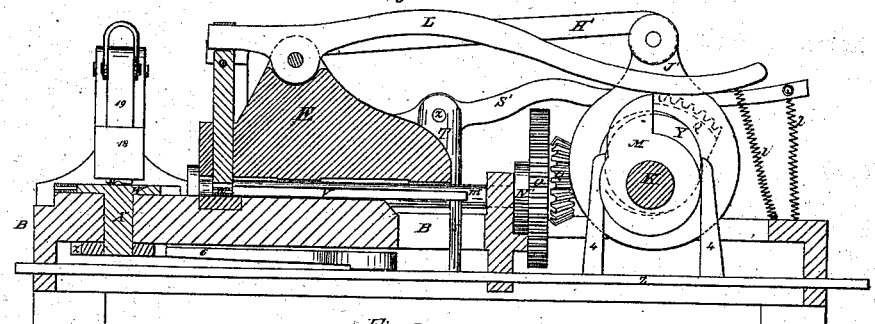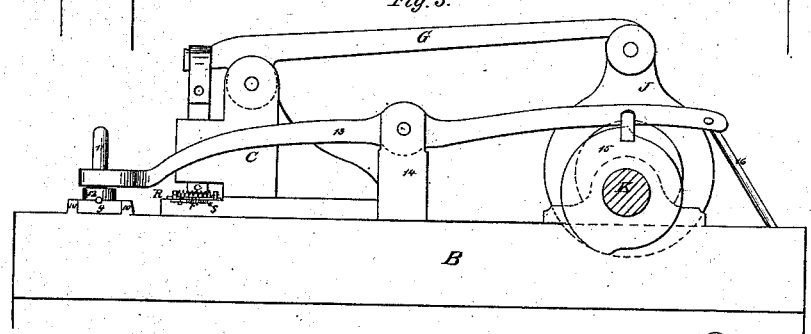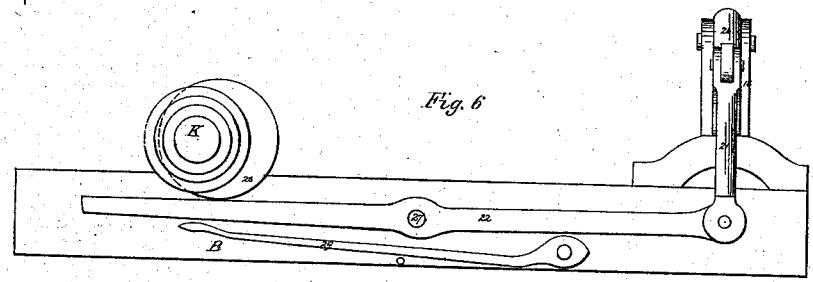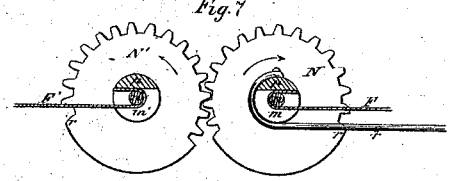

UNITED STATES PATENT OFFICE.

CHARLES MILLER, OF NEW YORK, N. Y.

IMPROVEMENT IN MACHINES FOR MAKING BUTT-HINGES.

Specification forming part of Letters Patent No. 12,443, dated February 27, 1855.

*To all whom it may concern:*

Be it known that I, CHARLES MILLER, of the city, county, and State of New York, have invented a new and useful Machine for Making Butt-Hinges of Wrought-Iron or other Metal Capable of being Punched and Bent; and I do hereby declare that the following is a full, clear, and exact description of the same, reference being had to the accompanying drawings, forming part of this specification, in which—

Figure 1 is a plan of the machine complete. Fig. 2 is a vertical section of the same in the line $x\ x$ of Fig. 1. Fig. 3 is a vertical section in the line * * of Fig. 1. Fig. 4 is a central vertical section at right angles to Figs. 2 and 3. Fig. 5 is a side view of a portion of the feeding mechanism for moving the metal from one to another stage of the operation, and of a portion of the punching mechanism as seen from the right side of the machine. Fig. 6 is a side view of the finishing mechanism as seen from the left-hand side of the machine. Fig. 7 is a section, on a scale larger than the previously-described figures, of the device by which the preparatory stage of forming the joint is effected. Fig. 8 is a plan of a guide which conducts the metal to the successive punching and cutting operations, and of a guard attached thereto to release the punches. Figs. 9, 10, 11, and 12 are face views of the punches and cutters employed to punch and cut the metal to form the hinges. Fig. 13 is a face view of a hinge for the manufacture of which the machine shown is specially adapted. Fig. 14 is an end view of the same. Fig. 15 is a face view of a piece of the strip or bar of metal from which the hinges are made, and Fig. 16 shows the appearance of the metal during the manufacture of the hinges. Fig. 17 shows the shape of the two pieces which are cut out and punched to form each hinge.

Similar letters and figures of reference indicate corresponding parts in the several figures.

This invention relates to the novel construction, arrangements, and combinations of certain mechanical devices and appliances for punching, bending, and cutting the metal to form the two parts of a hinge, for fitting the said parts together, inserting the pin and closing the joint, and for carrying them from one to another of the successive stages of the manufacture, whereby the hinge is or may be completed ready for use in one machine and at one operation.

Before proceeding to describe the construction and operation of the machine it will be well to give a general idea of the manner of forming the hinges, which will in some measure simplify the description of the machine. Two bars or strips of iron or other metal of a proper thickness and of a width equal to the length of the hinge, as will be seen by comparing the width of the strip, Fig. 15, with the length of the hinge, Fig. 13, by its side, are fed into the machine at opposite sides, but in the same line, and as they approach each other are cut by punches, one F to the form shown at the right hand of Fig. 16 and the other F' to the form shown at the left hand of the said figure, the former to represent a continuous repetition of the form A (shown at the right of Fig. 17) and the other a continuous repetition of the form A'. (Shown at the left of the same figure.) The parts $a$ and $a'\ a'$ at the inmost extremity of the two bars or strips when they have nearly met each other are bent by suitable mechanism to partly form the joint, and afterward advanced till they enter between and embrace each other. The two blanks A and A', constituting the partly-formed hinge, are then cut off from their respective strips and moved away in a direction laterally to the movement of the strips to the place where they receive the pin, and the parts $a$ and $a'\ a'$ are closed upon the pin to complete the hinge.

B is a strong table or bed of cast-iron, which may be supported by suitable standards to bring it to a convenient height. Upon this table are bolted five strong head-stocks C, C', D, D', and E, the first four of which contain the punches $c\ c'$ and $d\ d'$ (best shown in Fig. 3) and their respective dies, which punch the strips to form the blanks A and A', and the fifth contains the cutters by which the partly-finished hinges are cut from the strips. The above head-stocks are all ranged to bring their respective punches in line. The punches $c$ and $c'$ nearest the two sides of the machine are both alike in form, and are either of them represented in Fig. 9, the former being to punch the two screw-holes $e\ e$ in the blanks A and the latter similar holes in the blanks A'. The punch $d$ next to that $c$ is to cut the opposite notches $f\,f$ in the sides of the strip F, as shown in Fig. 16, to form the blanks A, and the punch $d'$ next to $c'$, occupying a corresponding position to $d$ on the opposite side of the machine, is to cut out the holes $g$ to form the blanks A'. The dies $k\,k$, belonging to all of the above punches, are made to fit them in the same manner as the dies of punching-machinery generally.

The cutters by which the partly-formed hinges are cut from the strips consist of rising and falling cutters $h\,h$, attached to an upright slider $i$, which is placed in the center of the machine and resembles in its character the punches above described, and they cut the metal over stationary cutting-edges at the bottom of the head-stock E. These cutters must have a recess between them of suitable size and form to enable the cutting to be effected without closing the joint of the hinges, which will be partly formed before they operate. The punches are attached each to the short arm of one of four similar levers G G' H H', whose fulcra consist of pins attaching them to the respective head-stocks of the punches and whose longer arms are connected with and operated upon by eccentrics I I' J' J on the main shaft K of the machine. These eccentrics are set for all the punches to operate at the same time. The cutter-slider $i$ is connected to the shorter end of a lever L, whose fulcrum, like that of the punch-levers, is in its own head-stock and whose longer arm is held by a spring $l$, connecting it to the table B, in contact with the periphery of a cam M on the main shaft, whose form is such that it will cause the movement of the cutters to be completed during about a fourth of the revolution of the main shaft.

The preparatory bend is given by means of two parallel rollers $m\,m'$, arranged in suitable bearings to work between the head-stock E and the head-stocks D D'. These rollers are cut away or otherwise constructed at the part where the strips of metal pass them in being conducted between the punches and dies, so as only to leave a central pin $n$ and a segment $p$ of less than half a circle, the space between the said pin and segment being just sufficient to admit the thickness of the strip which passes below the central pin. The strip is shown in the section Fig. 3 in red color. The shafts $m^*$ and $m^{*\prime}$ of the rollers $m\,m'$ are geared together at their rear ends by toothed wheels or sectors N N', and the roller-shaft $m^{*\prime}$ carries a larger toothed wheel or sector O, gearing with a similar wheel or sector O' on a small shaft P, (see Fig. 1,) carrying a bevel-toothed wheel or sector Q, gearing with a bevel-toothed sector Q' on the main shaft. The teeth on the sector Q' only extend about one-sixth part of a circle; but the relative sizes of the toothed wheels or sectors between it and the roller-shaft $m^{*\prime}$ are such as to give half a revolution to the rollers in the direction of the arrows shown in Fig. 7 for every revolution of the main shaft. Before the sector Q' comes into operation the rollers are in the position indicated in Fig. 3, with the segments $p\,p$ below the center-pins $n\,n$, and while stationary in that position they receive the hinge-blanks between the said pins and segments. The half-revolution given to the rollers through the sector Q' brings them to the position shown in Fig. 7, and in so doing gives a semicircular bend to the blank, as indicated in the latter figure, where, like in Fig. 3, the strip of which the blanks are formed is shown in red color. Having thus bent the blank, the rollers are returned to the position shown in Fig. 3 by a spring $q$, of india-rubber or other material, or by some equivalent thereof, applied to one or other of their shafts, but shown applied to $m^*$. The rollers are always stopped in the desired position to receive the blanks by the stops $r\,r$ at the ends of the gearing on their toothed sectors meeting and becoming incapable of rotating beyond that position.

The strips of metal F F', while being submitted to the operations of the punching, cutting, and bending devices above described, are guided between fixed steps or projections $s$ (see Figs. 5 and 8) on the bottom plates of the punch head-stocks and movable guide-plates $t$, which are secured to the said bottom plate by means of screws $u\,u$, passing through slots to allow them to move laterally to the strips of metal. The movable guide-plates $t$ have springs $v\,v$ applied to them to make them clamp the edges of the strips and prevent lateral movement, but to allow the movable guide-plates to yield to any want of uniformity in the width of the strips. The strips are held down to the dies by means of clamping-pieces R of steel plate, one placed over each die. These clamping-pieces are cruciform, as shown in Fig. 8, where a top view of one is given, and have two opposite arms secured to the head-stock and the other two arms pressing upon the strip; and they have openings in them to allow the punches to pass through.

The strips F F' are fed along toward the center of the machine, the former by a pair of reciprocating feeding-clamps $w\,w$ and the latter by a separate pair $w'\,w'$. The lower clamp of each pair consists of a quadrangular plate fitting to slide easily toward and from the center of the machine between two guide-pieces $x\,x$ on the table B. The upper clamp consists of a plate of similar form fitted to the lower one by studs $y\,y$ on the face of the latter, entering holes in the former, as shown in dotted outline in Fig. 3, and also shown in Fig. 1. The upper plate has a strong pin 35 above it to enter an eye in the front end of one of two levers S S', whose fulcra consist of pins $z\,z$ in two standards T T', secured to the table B. These standards are pivoted to the table B, so that the levers are capable of two movements—viz., a vertical and a lateral one. These movements are both given by two cams U U', aided by a spring 1, which connects the levers together, and two springs 2 2, which connect them with the table A. The cams are so constructed that as they move the respective levers to carry the clamps toward the center of the machine they lift the back ends of the said levers and cause the front end to bear down on the top clamps, and thus make them grasp the strips to feed them along; but as they move the levers in the opposite direction they allow the springs 2 2 to take off all pressure from the clamps to allow them to return, their return motion taking place while the punches are in operation, and the strips thus held stationary. The length of the feed must be just equal to the width of the blanks A A' from the edges 3 to the edges 4.

The operation of the machine, as far as its construction has been described, will now be briefly described before proceeding farther with the description of the other parts of the machine. The two strips F F' to make the hinges are placed without any previous preparation in the machine at opposite sides and received within the clamps. The first operation which takes place is that of the punching of the screw-holes by the punches $c$ and $c'$ $c'$, after which the strips are fed by the clamps toward the center of the machine till they arrive, respectively, under the punches $d$ $d'$ and have the notches $f f$ and the hole $g$ punched out. The next feed-movement after the operation of the last punches brings the parts $a$ and $a'$ $a'$ into the bending-rollers to have the bending operation performed. The next feed-movement puts the two blanks together, bringing the part $a$ between the parts $a'$ $a'$, and as soon as this is effected the blanks are cut off by the descent of the cutters $h$ $h$, which are at a distance apart equal to the whole width of the hinge when open.

In the foregoing operation the punches all act at once, and the notches $f f$ and hole $g$ to shape the pair of blanks for one hinge are made while the screw-holes of those to form another are being punched. The operations of cutting off the blanks which have received the preparatory bend to form the joint and giving the preparatory bend to the next pair must both take place during the same revolution of the shaft and during the time occupied by the operation of the punches, and the reason that the cutters $h$ $h$ receive a quick movement by a cam, instead of a gradual movement by eccentrics like the punches, is to cut the bent blanks off quickly immediately after the feed has taken place and allow the bending-rollers time to act on the next blanks before the punches are entirely withdrawn, as the punches serve to hold the strips in place during the bending operation.

When two blanks are put together and cut off, they require to be moved out of the way immediately to make room for the meeting of the next two, and this removal is effected in a forward direction or at right angles to the movement of the strips by means of a slider V, working in guides above the table, and the partly-finished hinge is received in one of a number of suitable recesses in the periphery of a horizontal disk or wheel W, which rotates close to a raised part of the surface of the table B upon a vertical shaft X, working through the table, for the purpose of carrying the hinges to those parts of the machine where the insertion of the pin and closing of the joint are performed and to hold them during the said operations. The slider V is driven by a cam Y on the main shaft, acting between two studs 4 4 on a sliding rod Z, working below the table, the said sliding rod connecting with the slider V by a stud 5, passing through the table. The same sliding rod Z serves to give the disk the necessary intermitting rotary motion by means of a pawl 6, (see Figs. 2 and 4,) attached to the said rod and engaging with a ratchet-wheel 7 at the bottom of the shaft X. The insertion of the pin is performed when the hinges severally arrive opposite to a tube 8, through which wire for the pins (represented in Figs. 1 and 2 by a blue line) is fed by a pair of feeding-clamps from a reel or coil arranged in any suitable manner. This reel or coil I have not thought it necessary to show.

The feeding-clamps consist of a plate 9 working between guides 10 10 on the table, and having an upright pin 11 attached to it, and a ring 12, fitting easily over the said pin, which has a hole through it near the bottom for the wire to pass through. The pin 11 is received above the ring 12 in the forked end of a lever 13, whose fulcrum is in a standard 14, pivoted to the table B. This lever, like the levers of the clamps for feeding the strips, has two movements given to it, the said movements being produced by a cam 15 on the main shaft and a spring 16, connecting it with the table. When the clamp moves in toward the tube 8, the ring 12 is pressed down by the lever and caused to grasp the wire to insert the end of it in the partly-formed joint of a hinge which at the time will be standing opposite to it in the wheel or disk W. The movement of the clamps will be sufficient to feed the proper length of wire for a hinge immediately after its insertion, and before any further movement of the wheel W the wire is cut off as close as convenient to the hinge by a cutter consisting of a disk 33, attached to the end of a lever 34, whose fulcrum 36 is in one side of the head-stock C, the said lever being operated by a cam 37 on the main shaft to bring the cutter in operation on the wire close to the mouth of the tube 8 to cut off the wire in the same manner as by a pair of shears. The small portion of wire remaining protruding through the end of the joint will be driven in by coming in contact, as the movement of the wheel proceeds, with a stationary eccentric curved piece 17, (see Fig. 1,) standing up from the table. The closing of the joint to finish the hinge is effected when the hinges severally arrive under a press 18, when the slider 19 of this press, which carries a die 38 of the requisite form comes down and closes the joint upon the pin. The slider 19 of this press is attached to one end of and operated by a lever 20, which has its fulcrum in the head-stock 18 of the press. The opposite end of this lever is connected by a rod 21 with the front end of a lever 22, (see Fig. 6,) working on a fulcrum 27 at the left side of the table. The back end of this lever is operated upon by a cam 28 on the main shaft and a spring 29, attached to the table. The finished hinge is discharged from the machine by being carried by the wheel W over a hole 30 in the table, which is large enough to let it fall through.

The machine is equally as well adapted for the manufacture of double-plate hinges, of which one is shown in Fig. 18, as for the manufacture of the single-plate hinge. For the manufacture of the double-plate hinge the blanks A* and A'* require to be of the form shown in Fig. 19, and the bend will be given at the parts $a^*$ and $a'^*$ $a'^*$, throwing the portion 31 of each over onto the portion 32. To make the blanks of this shape, the distances between the punches, the bending-rollers, and cutters must be increased and a longer feed be given to the strips to increase the distance between the notches $f\,f$ and holes $g$, as shown in Fig. 20, which represents the manner in which the strips are cut for the double-plate hinges. The cutting apart of the blanks will take place in the dotted lines midway between the notches $f\,f$ or the holes $g\,g$, and four screw-holes $e\,e\,e\,e$ will be necessary in each blank—viz., two on each side of the parts $a^*$ and $a'^*$ $a'^*$—and these must be so punched that when the joint is formed and closed those on one part of the plate will match with those of the other. The punches for the screw-holes of these hinges must be made each to punch four holes, two of which when the blanks are separated will be in one blank and two in the other.

The number of knuckles in the joint of the hinge may be increased by making the punches of such form as to punch one or more holes between every two corresponding notches $f\,f$ of one strip and to punch two or more holes between the same transverse lines through the other strip, as shown in Fig. 21.

What I claim as my invention, and desire to secure by Letters Patent, is—

1. The arrangement, as described, in the same line, of the punches $d$ and $d'$, which cut out two blanks to the proper shape for a hinge, and the bending-roller $m\,m'$, which give the preparatory bend to the two blanks to form the joint, whereby two strips or bars of metal fed at proper intervals of time toward each other under the said punches and through the said rollers are cut into blanks, bent, and put together ready to receive the pin, substantially as herein set forth.

2. Connecting together the two cutters $h\,h$, which cut off the two blanks, and arranging and operating the said cutters so that they will cut off the blanks both at the same time, but not until they have both received the preparatory bend to form the joint and been put together ready to receive the pin, substantially as herein set forth.

3. So controlling the operations of the punches $d$ and $d'$, which cut out the metal blanks, the rollers $m\,m'$, which give the preparatory bend to form the joints, and the cutters $h\,h'$, which cut off the partly-formed hinge from the strips, that all act during each intermission of the feed-movement, but that the cutters act more quickly or earlier than the punches, in order that the preparatory bending operation, which takes place after the action of the cutters, may be effected before the punches are entirely withdrawn from the metal, and that the punches may serve to hold the strips during the said bending operation, substantially as herein set forth.

4. The arrangement in any way, substantially as described, of a slider V and an intermittently-rotating wheel W for the purpose of removing the partly-formed hinges from where they are put together and cut off, and carrying them and holding them to receive the pin and have their joints finished—to wit, the said slider V, working transversely to the direction in which the strips of metal move to be submitted to the successive operations of punching, bending, and cutting off, and the intermittently-rotating wheel W being placed on the opposite side of the strips to the said slider.

5. The arrangement of the wire feeding and cutting apparatus and the press which carries the closing-die 38 in such a manner that the horizontal intermittently-rotating wheel W, which receives the partly-finished hinges when they are cut off, may bring and hold the hinges severally and successively first opposite the said feeding and cutting apparatus to receive the wire to form the pin and afterward opposite the said closing-die to have the joint closed. This I claim irrespectively of the particular means of feeding and cutting off the wire, as almost any kind of feeding and cutting apparatus may be used, and of the particular method of operating the closing-die, which may be operated by any of the means commonly employed for such purposes.

6. The eccentric curved piece, arranged substantially as shown in Fig. 1 of the drawings and herein described, for the purpose of finishing the insertion of the pin in the hinge by pushing into the joint so much of the pin as is left protruding when the pin is cut off, said pushing being effected by the carrying-wheel W, carrying the protruding end of the pin in contact with the said curved piece.

7. The general arrangement and combination of the several mechanical devices and appliances, substantially as herein shown, to form a machine for the manufacture of hinges from bars or strips of metal complete at one operation.

CHARLES MILLER.

Witnesses:
J. W. COOMB,
I. G. MASON.